July 3, 1962  J. E. ROBERTS ET AL  3,041,810
ROTARY MOWER FOR CUTTING HAY
Filed Sept. 10, 1959  2 Sheets-Sheet 1

INVENTORS:
JOE E. ROBERTS
MARC G. DAVENPORT
BY:

ATTORNEY

July 3, 1962 J. E. ROBERTS ET AL 3,041,810
ROTARY MOWER FOR CUTTING HAY
Filed Sept. 10, 1959 2 Sheets-Sheet 2

INVENTORS:
JOE E. ROBERTS
MARC. G. DAVENPORT
BY:

ATTORNEY 3,041,810
ROTARY MOWER FOR CUTTING HAY
Joe E. Roberts, Dothan, Ala., and Marc G. Davenport, Albany, Ga., assignors to Lilliston Implement Company, Albany, Ga., a corporation of Georgia
Filed Sept. 10, 1959, Ser. No. 839,119
6 Claims. (Cl. 56—25.4)

This application relates to a rotary mower for cutting hay.

Heretofore rotary mowers have been used extensively for cutting brush, grass, growing crops and the like, but in all such applications it was desired to finely comminute the cut material, and in many instances special mulching attachments were added. In the cutting of grass or other crops for hay, it is undesirable to cut or break the material more than the single cut of severing it from the ground, and the provision of rotary type mowing apparatus for doing this is the main object of our invention.

Another object of our invention is to provide a rotary type mowing machine for cutting hay in which the severed material is discharged immediately from the machine in a single combined cutting and discharging passage of the blade.

Another object of our invention is to provide rotary mowing apparatus for cutting hay in which means are provided to assist in windrowing and preventing wide scattering of the severed material.

Another object of our invention is to provide a machine of the class described which is efficient in operation and meets the demands of economic manufacture.

Other and further objects and advantages of our invention will be apparent from the following description taken in conjunction with the accompanying drawings wherein the same reference numerals designate the same or corresponding parts throughout the several views, and in which.

Figure 1:
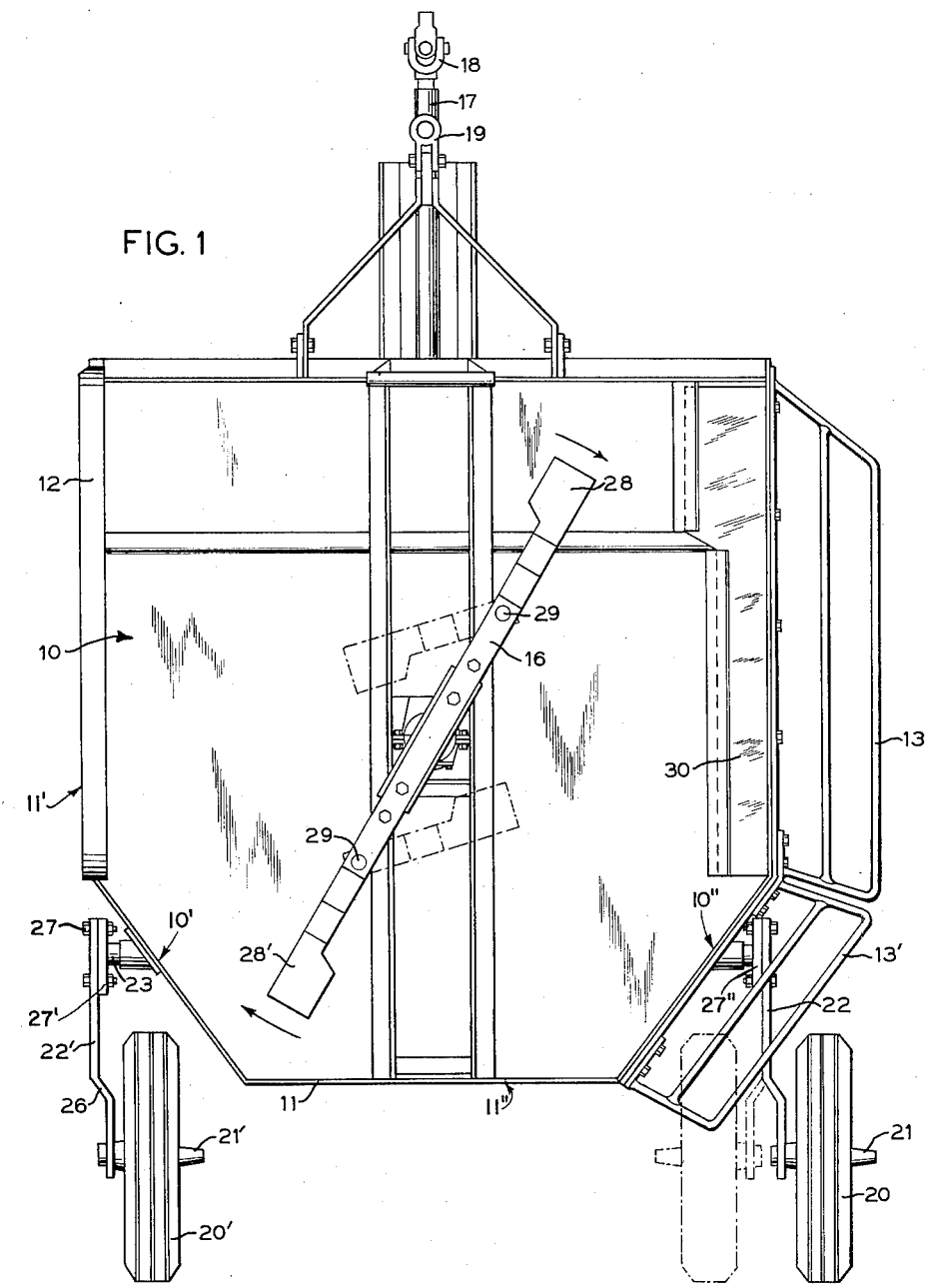
FIG. 1 is a bottom plan view of a mower according to our invention.

Referring more in detail to the drawings, it will be seen that our mowing machine comprises a travelling support 9 including a substantially flat, generally rectangular platform 10 having a depending skirt 11 extending along one side 11' and across the back 11" of the platform. A skid bar 12 is provided beneath the depending skirt along the side of the platform. The rear corners 10', 10" of the platform are oblique or chamfered, forming a six edged platform, and along the side opposite the depending skirt 11 there is attached to the platform an outwardly and substantially horizontally extending grill or guard 13, and a similarly extending grill or guard 13' is attached to the platform at the adjacent chamfered rear corner so that the horizontal grill work is substantially continuous and contiguous along the open side and adjacent the open rear corner of the platform.

Figure 2:
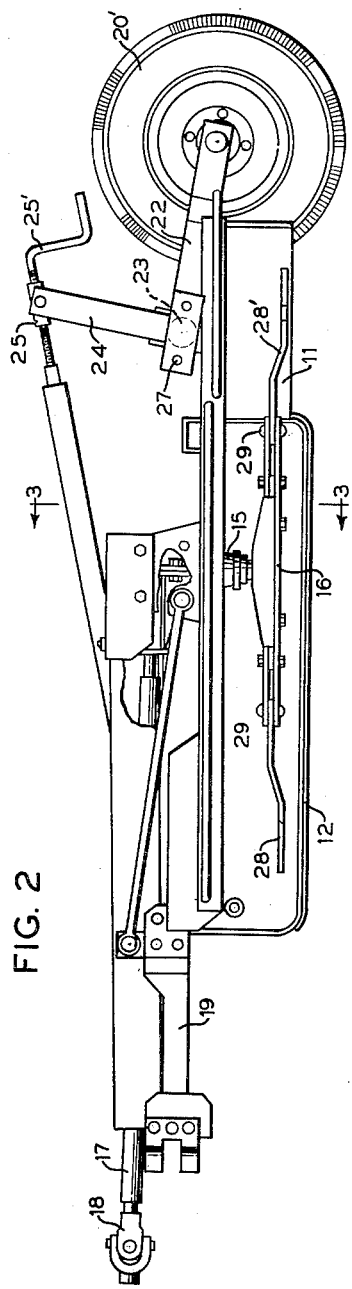
FIG. 2 is a side view of the machine shown in FIG. 1.
Figure 3:
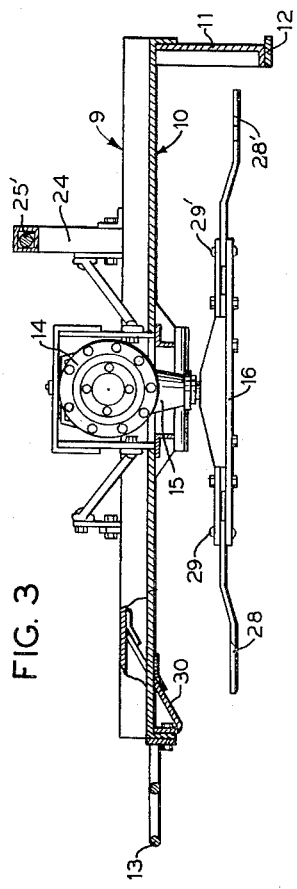
FIG. 3 is a transverse cross sectional view taken along the line 3—3 in FIG. 2.

On top of the platform, and substantially centrally thereof, is a gear box 14 having a downwardly extending drive portion 15 to which a double ended, elongated blade 16 is mounted for rotation beneath the platform 10. The positioning of the blade is such that, as shown in FIGS. 2 and 3, it is beneath the platform 10 but above the lowermost extent of the depending skirt 11. On top of the platform 10, the gear box 14 has attached thereto a drive shaft 17 arranged for attachment through universal joint 18 to the power take-off on a towing tractor (not shown), the illustrated embodiment of our mower having a draw bar 19 attached to the forward portion of the platform 10 for towing attachment, the platform 10 being supported upon a pair of wheels 20, 20', which are carried upon stub axles 21, 21', respectively, which are mounted on rearwardly extending arms 22, 22' which are removably connected at their forward ends to a transverse axle 23 which is mounted on the top of platform 10 for oscillatory movement about its longitudinal axis and adjustably held in position by means of adjustment post 24 which is fixed at its lower end to the transverse axle 23 and carries at its upper end the pivotally mounted, internally threaded sleeve 25 in which the threaded crank 25' is threadedly engaged.

It will be observed that the brackets 22, 22' are provided with a lateral offset 26 intermediate their ends, and inasmuch as the forward ends of these brackets are quickly detachable by removal of the bolts 27 from the bolt receiving fixtures 27', 27" on opposite ends of the axle 23, the distance between the trailing wheels can be quickly and easily adjusted by simply removing the attaching bolts 27 and reversing the brackets 22, 22', as the bracket 22 and its associated wheel 20 are shown to have been reversed in broken lines in FIG. 1.

Also, it will be noted that our cutting blade 16 is provided with a pair of free swinging cutting tips 28, 28', pivotally mounted to the ends of the blade member 16 at 29, 29', respectively. As shown in FIG. 3, beneath the platform 10, on the open side opposite the depending skirt 11, there is provided a downwardly and outwardly inclined baffle plate 30 for assisting in guiding the cut material outwardly beneath the grill 13.

In the operation of our device, it will be observed in FIG. 1 that the rotation of the cutting blade 16 is such that the cutting tips 28, 28' sweep beneath the open front toward the open side, and thence past the closed rear and closed side, in succession. As the machine is towed over the ground, the growing crop material to be cut for hay enters beneath the open front of the machine and is severed by the cutting tips as they sweep beneath the open front of the machine and the material cut is thrown immediately outwardly of the machine through the open side and open rear corner of the machine and beneath the grills 13, 13'. Such prompt discharging of the material from the machine prevents mulching or even, to a large extent, cutting more than by a single blade tip, inasmuch as the material cut by each individual blade tip is swept immediately to the open side of the machine where it is promptly discharged by centrifugal force. As the cut material passes beneath the grills 13, 13', the current of air swept along with the cut material between the platform 10 and the ground escapes upwardly through the open grill 13 while the cut material is still beneath the grills, and this action of releasing the cut material while it is still confined beneath the grills which permit the air blast to escape aids in windrowing the cut material rather than widely scattering it from the open side of the machine, thus enabling the cut material to be picked up later by a hay baler or other machinery.

The height of the cut above the ground can be easily adjusted by simply turning the hand crank 25' in one direction to lower the platform 10 which carries the rotating blade 16, or in the opposite direction to raise the same. It will be readily apparent that rotation of the threaded crank 25' will swing the post 24 either forwardly or rearwardly to rotate the axle 23 to raise or lower the wheels 20, 20' with respect to the platform, and conversely adjust the platform height above the ground on which the wheels rest. Also, it will be seen that the tracking of the wheels 20, 20' may be widened or narrowed by simply reversing the brackets 22, 22', as shown in broken lines in FIG. 1, and this operation necessitates only the removal of the attaching bolts 27, to be provided for each of the arms 22, 22'.

Having thus described our invention, it will be obvious to those skilled in the art that many modifications and changes can be made without departing from the spirit or scope of our invention as defined by the appended claims.

We claim:

1. In a rotary mower having a travelling support provided with a substantially vertical shaft journaled for rotation on said support, a cutting blade secured to said shaft for rotation beneath said support, and a driving device associated with said shaft and adapted for connection with the power take-off device of a tractor, the combination in which said support includes a platform, a depending skirt attached to said platform and extending along one side edge and the rear edge below the cutting plane of said blade, the front and opposite side edge being open beneath said platform for the entrance of material to be cut at the front and the discharge of cut material from said open side, and grill means attached to said platform and extending outwardly substantially horizontally from said open side for substantially the full length of said last mentioned side for assisting in the windrowing of material cut by said blade, said driving device being arranged to rotate said blade in a direction to cause it to turn from the front of said platform toward said open side.

2. In a rotary mower having a travelling support provided with a substantially vertical shaft journaled for rotation on said support, a cutting blade secured to said shaft for rotation beneath said support, and a driving device associated with said shaft and adapted for connection with the power take-off device of a tractor, the combination in which said support includes a generally rectangular platform with chamfered rear corners, a depending skirt attached to said platform and extending along one side edge and the rear edge and the included chamfered rear corner thereof below the cutting plane of said blade, the front and opposite side edge and adjacent chamfered rear corner being open beneath said platform for the entrance of material to be cut at the front and the discharge of cut material from said open side and adjacent open chamfered rear corner, and means attached to said platform and extending outwardly substantially horizontally from said open side for substantially the full length of said last mentioned side for assisting in the windrowing of material cut by said blade, said driving device being arranged to rotate said blade in a direction to cause it to turn from the front of said platform toward said open side.

3. In a rotary mower having a travelling support provided with a substantially vertical shaft journaled for rotation on said support, a cutting blade secured to said shaft for rotation beneath said support, and a driving device associated with said shaft and adapted for connection with the power take-off device of a tractor, the combination in which said support includes a generally rectangular platform with chamfered rear corners, a depending skirt attached to said platform and extending along one side edge and the rear edge and the included chamfered rear corner thereof below the cutting plane of said blade, the front and opposite side edge and adjacent chamfered rear corner being open beneath said platform for the entrance of material to be cut at the front and the discharge of cut material from said open side and adjacent open chamfered rear corner, and grill means attached to said platform and extending outwardly substantially horizontally from said open side and adjacent open chamfered rear corner for substantially the full length of said last mentioned side and rear corner for assisting in the windrowing of material cut by said blade, said driving device being arranged to rotate said blade in a direction to cause it to turn from the front of said platform toward said open side.

4. In a rotary mower having a travelling support provided with a substantially vertical shaft journaled for rotation on said support, a cutting blade secured to said shaft for rotation beneath said support, and a driving device associated with said shaft and adapted for connection with the power take-off device of a tractor, the combination in which said support includes a generally rectangular platform with chamfered rear corners, a depending skirt attached to said platform and extending along one side edge and the rear edge and the included chamfered rear corner thereof below the cutting plane of said blade, the front and opposite side edge and adjacent chamfered rear corner being open beneath said platform for the entrance of material to be cut at the front and the discharge of cut material from said open side and adjacent open chamfered rear corner, means attached to said platform and extending outwardly substantially horizontally from said open side and adjacent open chamfered rear corner for substantially the full length of said last mentioned side and rear corner for assisting in the windrowing of material by said blade, said driving device being arranged to rotate said blade in a direction to cause it to turn from the front of said platform toward said open side, and a baffle plate extending inwardly from said open side beneath said platform for directing cut material downwardly toward said open side.

5. In a rotary mower having a travelling support provided with a substantially vertical shaft journaled for rotation on said support, a cutting blade secured to said shaft for rotation beneath said support, and a driving device associated with said shaft and adapted for connection with the power take-off of a tractor, the combination in which said support includes a platform, a transverse axle journaled for adjustable oscillatory movement on said platform about its longitudinal axis, a pair of rearwardly extending arms laterally offset intermediate their ends and having one end removably bolted to an end of said axle, respectively, said arms being reversible to reverse the lateral offset, and a stub shaft at the free end of each of said shafts mounting a supporting wheel.

6. In a rotary mower having a travelling support provided with a substantially vertical shaft journaled for rotation on said support, a cutting blade secured to said shaft for rotation beneath said support, and a driving device associated with said shaft and adapted for connection with the power take-off of a tractor, the combination in which said support includes a platform, a transverse axle journaled for adjustable oscillatory movement on said platform about its longitudinal axis, a bolt receiving fixture on each end of said axle, a pair of rearwardly extending arms laterally offset intermediate their ends and having one end removably bolted to the fixture on an end of said axle, respectively, said arms being reversible to reverse the lateral offset, and a stub shaft at the free end of each of said shafts mounting a supporting wheel.

References Cited in the file of this patent
UNITED STATES PATENTS

| | | |
|---|---|---|
| 2,736,350 | Hill et al. | Feb. 28, 1956 |
| 2,751,737 | Herod | June 26, 1956 |
| 2,818,269 | Northcote et al. | Dec. 31, 1957 |
| 2,857,725 | Canfield | Oct. 28, 1958 |
| 2,891,369 | Rietz | June 23, 1959 |